US009367741B2

(12) United States Patent
Le Marec

(10) Patent No.: US 9,367,741 B2
(45) Date of Patent: Jun. 14, 2016

(54) DEVIATION INDICATOR WITH INFRARED IMAGERY AND SYSTEM FOR AUTOMATICALLY AIMING AT AND TRACKING A TARGET

(71) Applicant: MBDA FRANCE, Le Plessis-Robinson (FR)

(72) Inventor: Jean-Claude Le Marec, Paris (FR)

(73) Assignee: MBDA FRANCE, Le Plessis-Robinson (FR)

( * ) Notice: Subject to any disclaimer, the term of this patent is extended or adjusted under 35 U.S.C. 154(b) by 0 days.

(21) Appl. No.: 14/429,331

(22) PCT Filed: Sep. 17, 2013

(86) PCT No.: PCT/FR2013/000244
§ 371 (c)(1),
(2) Date: Mar. 18, 2015

(87) PCT Pub. No.: WO2014/044928
PCT Pub. Date: Mar. 27, 2014

(65) Prior Publication Data
US 2015/0220780 A1 Aug. 6, 2015

(30) Foreign Application Priority Data
Sep. 20, 2012 (FR) .................................... 12 02493

(51) Int. Cl.
*G06K 9/00* (2006.01)
*F42C 13/02* (2006.01)
*G01S 17/10* (2006.01)
*G01S 17/66* (2006.01)
*F41G 7/22* (2006.01)
*G01S 7/486* (2006.01)
*G01S 7/487* (2006.01)
*G06K 9/52* (2006.01)
*H04N 5/33* (2006.01)

(52) U.S. Cl.
CPC .......... *G06K 9/00624* (2013.01); *F41G 7/2246* (2013.01); *F41G 7/2293* (2013.01); *F42C 13/023* (2013.01); *G01S 7/4863* (2013.01); *G01S 7/4873* (2013.01); *G01S 17/107* (2013.01); *G01S 17/66* (2013.01); *G06K 9/52* (2013.01); *H04N 5/33* (2013.01)

(58) Field of Classification Search
None
See application file for complete search history.

(56) References Cited

U.S. PATENT DOCUMENTS 3,935,818 A 2/1976 Johnson
6,626,396 B2 9/2003 Secker
(Continued)

FOREIGN PATENT DOCUMENTS

EP 0309927 A2 4/1989
EP 1248120 A2 10/2002
GB 2280734 A 2/1995

OTHER PUBLICATIONS

International Search Report (PCT/ISA/210) for PCT/FR2013/000244 mailed Jan. 16, 2014.

*Primary Examiner* — Soo Park
(74) *Attorney, Agent, or Firm* — Koppel, Patrick, Heybl & Philpott

(57) ABSTRACT

The invention relates to a deviation indicator with infrared imagery and a system for automatically aiming at and tracking a target. According to the invention, the deviation indicator with infrared imagery comprises an infrared pulsed laser (11) and the device (12) for controlling and processing infrared images also processes the laser pulse echoes.

5 Claims, 3 Drawing Sheets

(56) References Cited

U.S. PATENT DOCUMENTS

| | | | | |
|---|---|---|---|---|
| 8,194,126 B2 * | 6/2012 | David | ................ | G01S 7/483 348/139 |
| 8,599,367 B2 * | 12/2013 | Canham | ................ | G01C 3/08 356/3.01 |
| 8,885,152 B1 * | 11/2014 | Wright | ................ | H04N 5/33 356/3.01 |
| 8,934,087 B1 * | 1/2015 | Stobie | ................ | H04N 5/33 356/3.01 |
| 2004/0051859 A1 * | 3/2004 | Flockencier | ................ | G01S 7/487 356/4.01 |

* cited by examiner

Fig. 6A
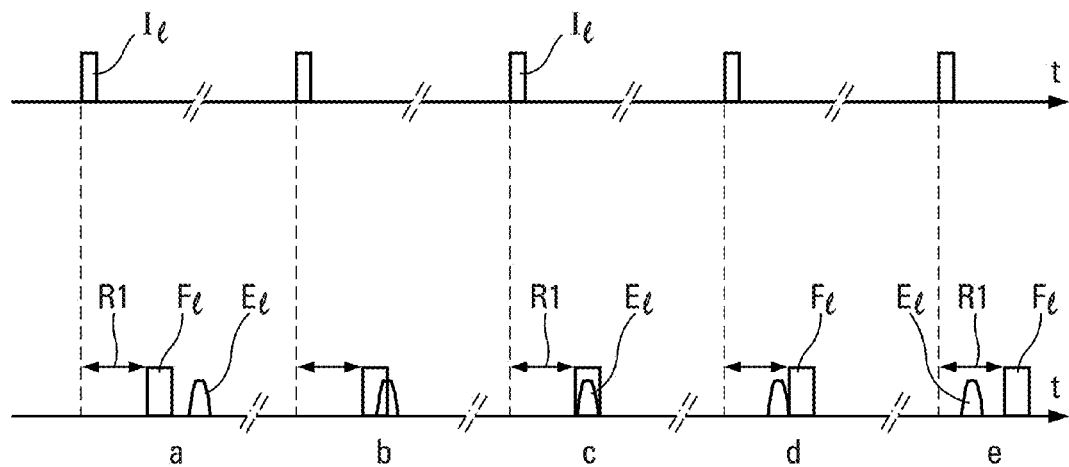
Fig. 6B
Fig. 7A
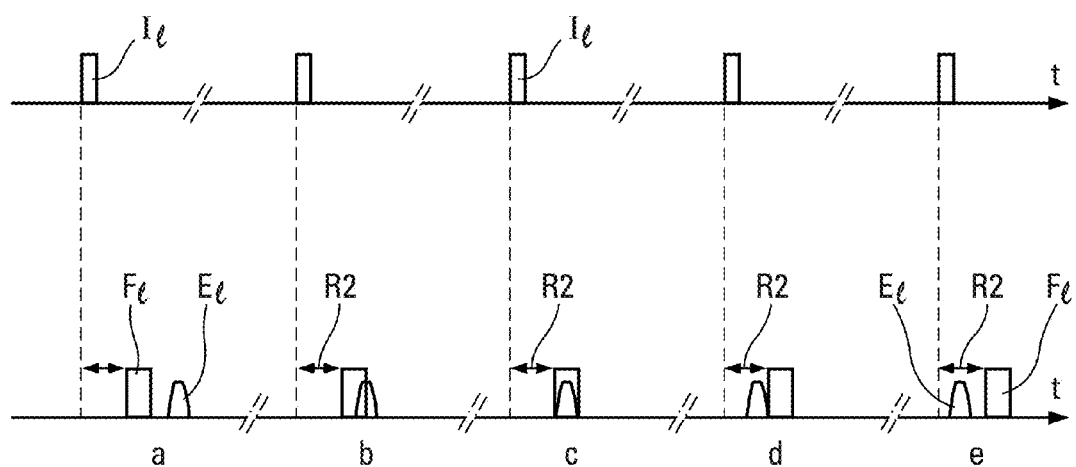
Fig. 7B

DEVIATION INDICATOR WITH INFRARED IMAGERY AND SYSTEM FOR AUTOMATICALLY AIMING AT AND TRACKING A TARGET

The present invention relates to a deviation indicator with infrared imagery and a system for automatically aiming at and tracking a target, intended to be installed on board a carrier, such as a missile.

It is known that, in order to be able to deal with a target, a missile must be able to locate said target, frame it in its field of view and keep it centred in this field through automatic tracking despite the relative movements of said target and said missile. To do this, using a deviation indicator with infrared imagery comprising an infrared matrix detector, an optical aiming device through which said infrared matrix detector is able to observe said target, and a device for controlling and processing the infrared images formed on said infrared matrix detector is already known, said optical aiming device being able to be oriented and controlled in the direction of said target by said image control and processing device.

Moreover, in order to trigger the firing of the destructive weapon carried by said missile in order to destroy said target, said missile comprises a proximity detector, also referred to as a distance indicator or proximity fuse, which measures the missile-target distance, when the missile and the target are close to each other.

Such a proximity detector generally comprises a plurality of lateral elements angularly distributed equally on the fuselage of the missile in order to create a detection coverage of 360° around said fuselage of the missile. Such a proximity detector therefore occupies a large amount of space on the missile. In addition, the mechanical and electrical interface devices required by such a proximity detector are complex, expensive and bulky.

The object of the present invention is to remedy these drawbacks.

For this purpose, according to the invention, the deviation indicator with infrared imagery intended to be installed on board a carrier, such as a missile, and comprising:
- an infrared matrix detector, able to form a plurality of successive infrared images,
- an optical aiming device, through which said infrared matrix detector is able to observe an approaching target, and
- a control and processing device for controlling said infrared matrix detector and for processing the infrared images formed on said infrared matrix detector, is characterised in that:
- it comprises an infrared laser able, by means of said optical aiming device, to emit infrared laser pulses in the direction of said target, the echoes of said infrared laser pulses, reflected by said target, being received by said infrared matrix detector through said optical aiming device;
- said control and processing device in addition processes the images of said echoes, formed on said infrared matrix detector, in order to determine the distance at which said target is situated;
- said control and processing device associates with each of said infrared laser pulses emitted by said infrared laser a plurality of successive echo acquisition windows by means of said infrared matrix detector; and
- the opening of the echo acquisition windows is effected, with respect to the emission of the corresponding infrared laser pulse, with a plurality of decreasing successive delays $2D/c$ (c being the speed of light) corresponding to decreasing successive expected distances D between said deviation indicator and the target up to a predetermined low value as from which the control and processing device prepares the firing of the destructive weapon carried by said carrier.

Thus, by means of the present invention, said deviation indicator with infrared imagery becomes three-dimensional and can, in alternation, fulfill the function of infrared imaging and the function of proximity detection. The distance indicators used in the prior art can therefore, along with their drawbacks, be discarded.

It is known that, generally, deviation indicators with infrared imagery work in the frequency band lying between 3 µm and 5 µm with a frequency of between 100 Hz and 1 kHz. The wavelength and frequency of said infrared laser pulses can then respectively lie between 0.9 µm and 2 µm and between 1 kHz and 10 kHz.

For example, said infrared laser is of the laser diode, YAG, erbium-YAG or erbium-doped fibre type.

Thus, according to the invention, the control and processing device associates, with each of said infrared laser pulses emitted by said infrared laser, a window for acquiring echoes by means of said infrared matrix detector and the opening of such an echo acquisition window is done with a delay equal to $2D/c$ with respect to the corresponding infrared laser pulse, c being the speed of light and D an expected distance between said deviation indicator and the target.

The delay $2D/c$ therefore corresponds to the period between the emission of an infrared laser pulse and the reception of the corresponding echo, in the case where the target is situated at the distance D from the deviation indicator. As long as the target-deviation indicator distance is greater than D, no echo image is formed on the matrix detector. On the other hand, as soon as this distance becomes equal to D, the image of the echo forms on said matrix detector, and this distance is indicated by the appearance of this echo image.

After the finding that the target has actually just passed to a particular value D1 of D, the echo acquisition windows are next opened with a delay equal to $2D2/c$, D2 being an expected distance less than D1. It is thus possible to successively track the approach of said target, giving to the distance D decreasing successive values. When the distance at which the target is situated reaches a predetermined low value, the control and processing device prepares the firing of the destructive weapon carried by said carrier.

In order to avoid the detection of false echoes due to background noise, the control and processing device assigns a given portion of said matrix detector to said echoes of the infrared laser pulses, the number of pixels of said matrix detector portion also being determined, and considers that an image received on said given portion of the matrix detector is one of the echoes of the infrared laser pulses, when the sum of the signals received by the pixels of said given portion of the matrix detector is above a predetermined threshold.

The present invention also relates to a system for automatically aiming at and tracking a target comprising a deviation indicator according to the present invention.

The figures of the accompanying drawing will give a clear understanding of how the invention can be implemented. In these figures, identical reference signs denote similar elements.

Figure 5:
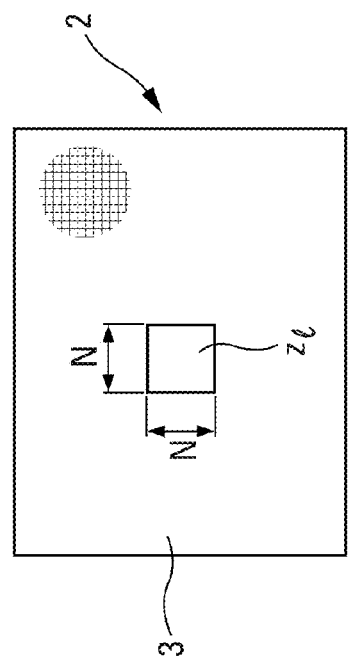

FIG. 5 schematically shows the region of the matrix of the infrared matrix detector on which the images of the echoes of the infrared laser pulses form.

FIGS. 6A, 6B and 7A, 7B show, as a function of time t, a preferred process of the functioning of the distance indicator of the deviation indicator in accordance with the present invention.

Figure 1:
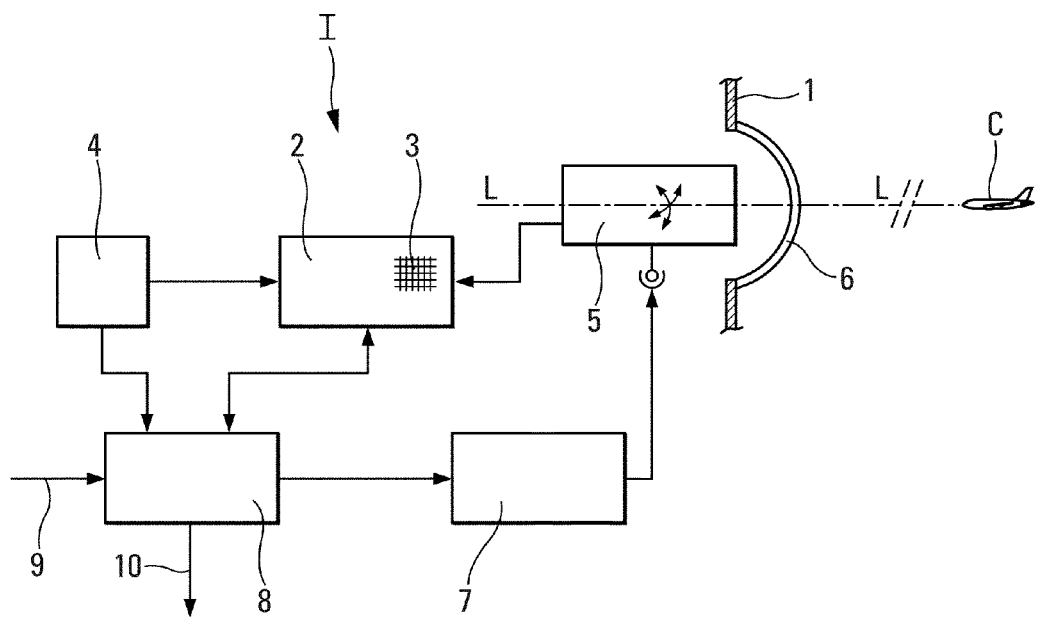
FIG. 1 is the block diagram of a system for automatically aiming at and tracking a target, comprising a known deviation indicator with infrared imagery.

The system for automatically aiming at and tracking a target I, shown schematically in FIG. 1, is of a known type with a deviation indicator with infrared imagery and is installed on board a missile 1 of axis L-L, only part of the front of the fuselage of which is depicted.

Figure 2:
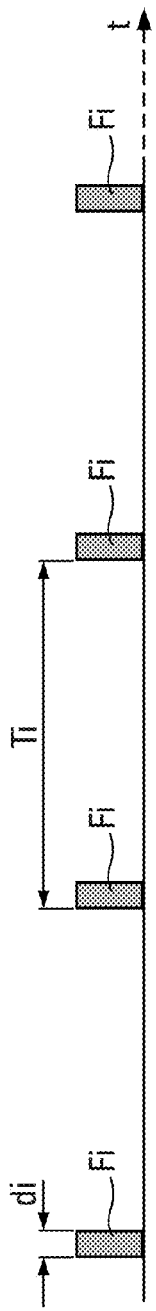
FIG. 2 is a diagram, as a function of time t, showing the series of integration windows of the deviation indicator of FIG. 1.

This system I comprises an infrared detector 2 provided with an infrared detection matrix 3 and able to open, under the control of a clock 4, image-integration windows Fi periodically spaced apart (see FIG. 2). For example, the infrared detection matrix 3 integrates infrared images in the frequency band lying between 3 and 5 µm, the duration di of the windows Fi is around 0.5 ms and the frequency 1/Ti of said windows Fi is between 100 Hz and 1 kHz.

The infrared detector 2 is able to observe a target C, airborne or on land, by means of an orientable optical aiming device 5, which looks towards the front of the missile 1 through a multispectral dome 6 (for example made from sapphire) on said missile and the line of sight of which is controlled for orientation about the longitudinal axis L-L by means of a control device 7, in order to be able to track the target C.

The image signals received by the infrared detector 2 during the windows Fi are integrated and processed in an image control and processing device 8 which, by means of a line 9, receives position and attitude information coming from the inertial unit (not shown) of the missile 1. The image control and processing device 8 controls the control device 7 aiming at and tracking the target C by means of the optical aiming device 5.

At the output 10 of the image control and processing device 8, the deviation-indication signals for guiding the missile 1 towards the target C appear.

Figure 3:
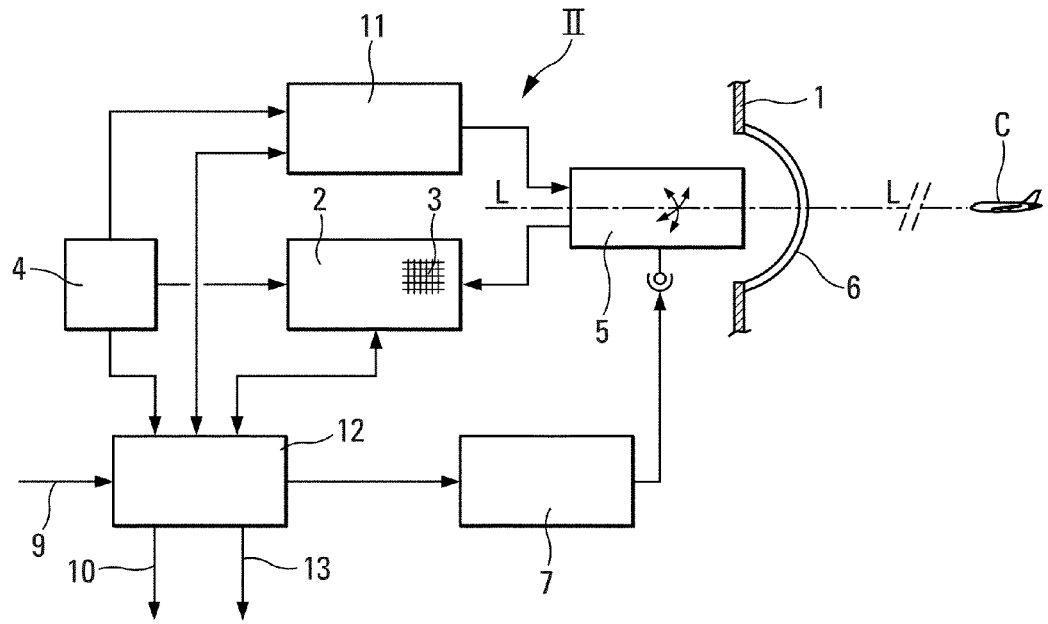
FIG. 3 is a block diagram of a system for automatically aiming at and tracking a target comprising the deviation indicator according to the present invention.

The system II for automatically aiming at and tracking a target with a deviation indicator with infrared imagery according to the present invention and shown schematically in FIG. 3 comprises the elements 1 to 7 and 9, 10 of the known system I described above with regard to FIG. 1.

This system II in addition comprises an infrared laser 11 able to emit, by means of the orientable optical aiming device 5, infrared laser pulses I/ in the direction of the target C. For example, the infrared laser 11 is of the laser diode, YAG, erbium-YAG or erbium-doped fibre type and emits in an infrared band lying between 0.9 and 2 µm, the duration dl of the laser pulses Il is around 1 to a few tens of ns and the frequency 1/Tl of said laser pulses—very much higher than the frequency 1/Ti of the windows Fi—is, for example, between 1 kHz and 10 kHz (see FIG. 4).

Figure 4:
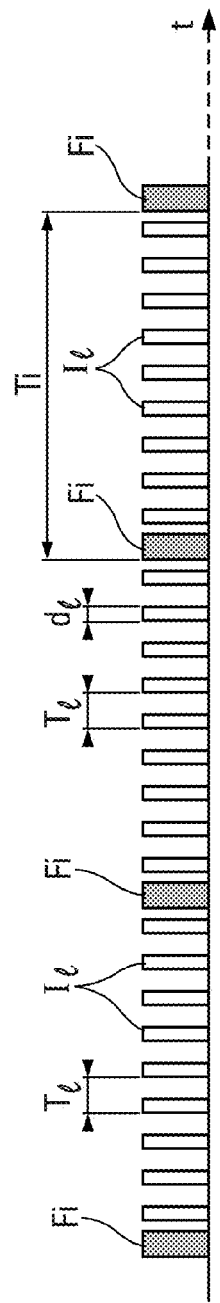
FIG. 4 is a diagram, as a function of time t, showing the series of integration windows of the deviation indicator of the system of FIG. 3 and the series of infrared laser pulses emitted by said infrared laser.

Thus, as shown in FIG. 4, a collimated beam of a plurality of laser pulses Il can be emitted, by means of the orientable optical aiming device 5 and the dome 6, in the direction of the target C.

In replacement for the image control and processing device 8 of the system I of FIG. 1, the system II of FIG. 2 comprises a control and processing device 12, connected not only to the matrix detector 2 and the control device 7, but also to the infrared laser 11. In addition, the control and processing device 12 is able not only to control the infrared matrix detector 2 and to process the deviation-indication infrared images (in a way identical to the device 8), but also to control the infrared laser 11 and to process the images of the echoes of said laser pulses reflected by the target C.

The control and processing device 12 assigns to the echoes of the infrared laser pulses a given portion zl of the detection matrix 3 of the infrared detector 2. As shown in FIG. 5, this portion zl can be disposed centrally with respect to the detection matrix 3 and have a square form containing $N^2$ pixels. When said portion zl of the detection matrix 3 is illuminated, the control and processing device 12 considers that the corresponding image is an echo of a laser pulse Il if the sum of the signals received by the pixels of said portion zl is above a pre-established threshold.

FIGS. 6A, 6B, 7A, 7B show the functioning mode of the system II according to the invention. In a functioning step,
   the control and processing device 12 associates an echo acquisition window Fl with each infrared laser pulse Il,
   the echo acquisition windows Fl are first of all opened with a delay R1 with respect to the infrared laser pulses Il equal to 2 D1/c, c being the speed of light and D1 an expected distance between the system II and the target C,
   as long as the target C is at a distance from the system II greater than D1 (the case with the diagram a in FIG. 6B), no laser pulse echo El is situated in the window Fl and no echo image appears in the portion zl of the matrix 3,
   when the target C reaches the distance D1, the echo El passes successively through the successive echo acquisition windows (diagram b, c and d in FIG. 6B), and then this relative movement continuing, the echo El leaves a following window Fl.

Thus, on the portion zl of the infrared detection matrix 3, the image of the echo El increases and then disappears. When this disappearance occurs, it is certain that the target C has just passed to the distance D1 from the system II of the invention.

It is then possible to successively recommence this functioning step on one or more occasions with a delay R2 less than R1 (see FIGS. 7A and 7B), corresponding to a distance D2 less than D1, and then with a delay R3 less than R2, etc.

Thus, step by step, it is possible to know the successive decreasing values D1, D2, etc. of the distance at which the target C is situated.

When this distance takes a predetermined low value Di, the control and processing device 12 extrapolates the relative missile-target trajectory and, at its output 13, emits a signal to fire the destructive weapon carried by the missile 1.

The invention claimed is:

1. A deviation indicator with infrared imagery comprising:
   an infrared matrix detector, that forms a plurality of successive infrared images,
   an optical aiming device, through which said infrared matrix detector observes an approaching target, and
   a control and processing device for controlling said infrared matrix detector and for processing the successive infrared images formed on said infrared matrix detector;
   an infrared laser that emits infrared laser pulses as directed by said optical aiming device toward said approaching target, in which echoes of said infrared laser pulses reflected by said target are received by said infrared matrix detector through said optical aiming device;
   said control and processing device processing said echoes formed on said infrared matrix detector to determine a distance at which said approaching target is situated from said deviation indicator, and assigns a portion of said infrared matrix detector to said echoes of said infrared laser pulses, such that when a sum of signals received by a number of pixels in said portion of said infrared matrix detector is above a predetermined threshold, said control and processing device determines that an image is received in said portion of said infrared matrix detector;

said control and processing device associating a plurality of successive echo acquisition windows with each of said infrared laser pulses emitted by said infrared laser through said infrared matrix detector; and an opening of the plurality of successive echo acquisition windows is effected with a plurality of decreasing successive delays corresponding to decreasing successive expected distances between said deviation indicator and said approaching target with respect to the emission of the corresponding infrared laser pulse, up to a predetermined low value.

2. The deviation indicator according to claim 1, wherein a wavelength of said infrared laser pulses is between 0.9 µm and 2 µm.

3. The deviation indicator according to claim 1, wherein a frequency of said infrared laser pulses is between 1 kHz and 10 kHz.

4. A system for automatically aiming at and tracking a target, comprising a deviation indicator with infrared imagery as specified in claim 1.

5. The deviation indicator according to claim 1, in which the control and processing device fires a destructive weapon when the expected distance is less than the predetermined low value.

* * * * *